United States Patent

[11] 3,537,466

[72] Inventor Donald W. Chapin
Scottsdale, Arizona

[21] Appl. No. 686,994
[22] Filed Nov. 30, 1967
[45] Patented Nov. 3, 1970
[73] Assignee The Garrett Corporation
Los Angeles, California
a corporation of California

[54] FLUIDIC MULTIPLIER
8 Claims, 3 Drawing Figs.

[52] U.S. Cl. .......... 137/81.5
[51] Int. Cl. .......... F15c 1/12, F15c 1/16
[50] Field of Search .......... 137/81.5

[56] References Cited

UNITED STATES PATENTS

| | | | |
|---|---|---|---|
| 3,193,197 | 7/1965 | Bauer | 137/81.5X |
| 3,238,960 | 3/1966 | Hatch | 137/81.5 |
| 3,267,946 | 8/1966 | Adams et al. | 137/81.5 |
| 3,279,488 | 10/1966 | Jones | 137/81.5 |
| 3,379,204 | 4/1968 | Kelley et al. | 137/81.5 |
| 3,410,291 | 11/1968 | Boothe et al. | 137/81.5 |

*Primary Examiner*—Samuel Scott
*Attorneys*—Herschel C. Omohundro and H. Vincent Harsha

ABSTRACT: The device shown herein comprises a purely fluid amplifying means in which a beam-deflection-type amplifier and a vortex-type fluid amplifier are combined in such a manner as to provide an output signal which is the product of two variable input signals.

Figure 1:
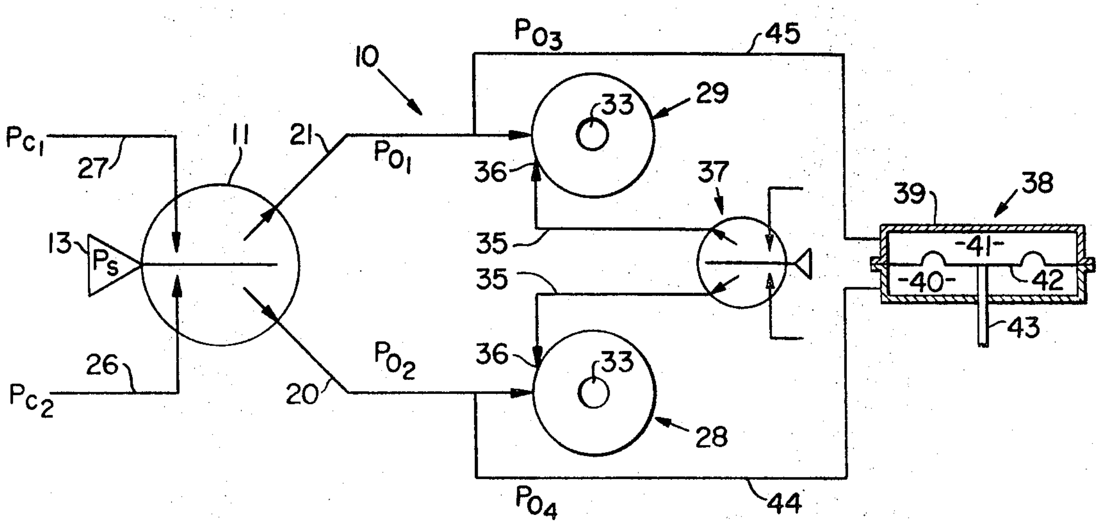

INVENTOR.
DONALD W. CHAPIN
BY
Herschel C. Omohundro
ATTORNEY

FLUIDIC MULTIPLIER

SUMMARY

This invention relates generally to purely fluid amplifying systems and more particularly to a combination of fluid amplifiers which cooperate to produce an output with a wide range of gain or sensitivity. Beam-deflection amplifiers have previously been utilized in fluid control systems and it is known that such devices have an output-to-input gain or sensitivity that is subject to the amount of loading or flow that the receiver or output passage is delivering. In previously known devices such gain or sensitivity has been substantially fixed or unchangeable with the result that use of systems embodying such devices or combinations thereof has been severely limited.

It is an object of this invention to combine a plurality of fluid amplifying devices in a manner to secure such change or variation in gain or sensitivity that the system embodying the construction will be much more useful than prior systems.

A further object of the invention is to provide a purely fluid amplifying system wherein the loading of the output of a beam-deflection-type amplifier may be responsive to a fluid pressure from an extraneous source whereby the output will have a change in sensitivity not heretofore obtainable.

A still further object of the invention is to provide means for securing the preceding objectives without the addition of mechanical devices or structure requiring movement of anything other than the fluid itself.

Still another object of the invention is to provide a purely fluid amplifier system having a first amplifier of the beam-deflection type which has an output controlled in part by a first input and in part by a second input which is utilized to control the flow or loading of such output. This objective is attained by applying a variable resistance to the flow of the amplifier output through the use of a vortex-type fluid amplifier in the output passage, the second input being supplied to the vortex amplifier in a manner to govern the flow of output fluid. In this way the fluid pressure in the output passage will be the product of the first and second inputs.

More specifically, it is an object of this invention to provide the combination in a fluid control system of a beam-deflection amplifier having a first nozzle to direct a fluid power jet toward a pair of receiver passages, and a control nozzle on either side of the first nozzle to apply first input signals from a selected source to said power jet to deflect the same toward one or the other receiver or output passages to create certain outputs therein and disposing a vortex-type fluid amplifier in each output passage in such a fashion that the output flow will be directed through an inlet port into the cylindrical chamber of the amplifier, the vortex amplifier being provided with a control flow nozzle so arranged as to direct a second input from another source against the entering fluid stream to cause vortical flow which imposes a resistance to flow in the output passage from the beam amplifier and consequent change in output pressure which is a function of the second input pressure. As a result, the output is changed in response to variations in both first and second inputs and can be said to be a product of such inputs.

Further objects and advantages of the invention will be made apparent by the following more specific description of the form of the invention selected for illustration in the accompanying drawings.

THE DRAWINGS

Figure 2:
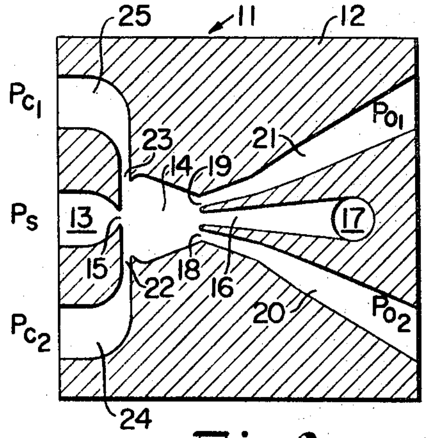
Figure 3:
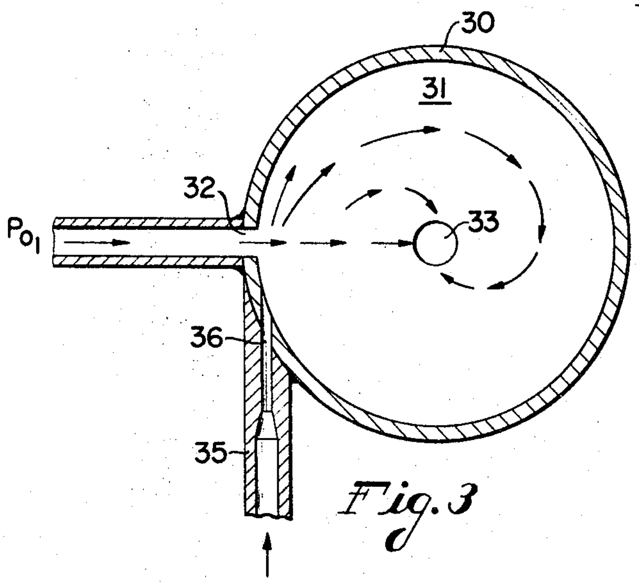

In the drawings, FIG. 1 is a schematic view of a portion of a fluid control system;

FIG. 2 is a sectional view of a typical fluid amplifier forming a part of a system as shown in FIG. 1; and FIG. 3 is a similar view of a typical vortex-type fluid amplifier used in the system shown in FIG. 1.

Referring more particularly to the drawings, and especially to FIG. 1, the numeral 10 designates generally the portion of a fluid system shown in this FIG. As pointed out in the objectives, the invention herein is directed to a combination of purely fluid amplifiers which are arranged in the system to secure a predetermined result, namely, an output signal which is the product of two variable input signals.

The system shown in FIG. 1 includes a first amplifier 11 which is of the so-called "beam-deflection" type. One configuration of this amplifier, shown more in detail in FIG. 2, includes a body 12 provided with passages including an inlet 13 which receives fluid under pressure $P_s$ from a suitable source. The body 12 has an internal chamber 14 with which the inlet 13 communicates through a reduced jet nozzle 15. This nozzle serves to direct fluid under supply pressure into the chamber 14 in a stream referred to hereinafter as a "power jet." Under normal conditions this power jet will flow directly across the chamber 14 to an intermediate opening 16 leading to a vent 17. This opening is disposed between a pair of receivers 18 and 19 which lead to output passages 20 and 21, respectively.

The body 12 is further provided with an additional nozzle at each side of the nozzle 13, these additional nozzles being designated by the numerals 22 and 23 and constituting control nozzles. The nozzles 22 and 23 communicate with inlet ports 24 and 25. These ports further communicate with passages 26 and 27, respectively, to which fluid under pressure is supplied from a selected source or sources. The fluid supplied to passages 26 and 27 constitutes a first input control pressure, the different passages receiving fluid under differential pressures $P_{c1}$ and $P_{c2}$, depending upon the selected sources. When differential pressures are so supplied, the jets issuing from the nozzles 22 and 23 will react with the power jet stream causing it to move to one side or the other of the vent opening 16, depending upon the relation of the control pressures. One of the receivers 18 or 19 will receive a greater proportion of the fluid than the other and this fluid will flow through the respective output passage.

As shown in FIG. 1, the output passages 20 and 21 extend to the inlet ports of vortex amplifiers 28 and 29 disposed in the system shown in FIG. 1. One of the vortex amplifiers is shown in detail in FIG. 3. It includes a body 30 forming a circular chamber 31, the inlet 32 of which is disposed to direct fluid flowing into the chamber toward a reduced outlet 33 formed centrally in one end wall of the body. In the absence of any other circumstance, fluid supplied to the inlet 32 will flow across the cylindrical chamber to the outlet vent 33. The vortex amplifier is provided with a control fluid input passage 35 which terminates in a nozzle 36 disposed so that fluid supplied from a suitable source 37 to nozzle 36 will enter the chamber 31 tangentially and tend to flow around the chamber. Such fluid will impinge on the stream entering the inlet 32 and cause the formation of a vortex as the fluid flows to the outlet vent 33. By causing vortical flow, a resistance is applied to the entering stream, such resistance depending upon the force of the control jet supplied through nozzle 36. By the imposition of such resistance, pressure in the output passages from the beam-deflection amplifier may be increased by reducing the amount of fluid flowing out of the respective output passage. The extent of pressure change may be varied through adjustment of the pressure of the control jet input from source 37. This input may be taken from any desirable source. As shown in FIG. 1, each output passage is provided with a vortex amplifier which receives control fluid from the selected source. The resistance applied to the flow in the output passages will thus be a function of the control pressure applied thereto. It will be apparent that differential pressures may be applied to the control input passages of the vortex amplifiers 28 and 29 if desired.

As shown in FIG. 1, the pressures from the output passages may be utilized in the operation of a selected mechanism such as an actuator designated generally in FIG. 1 by the numeral 38. This actuator may be of any suitable type, a flexible diaphragm device being selected for purposes of illustration only. This device has a chamber-forming casing 39 divided into differential pressure sections 40 and 41 by a flexible diaphragm 42. An actuator rod 43 extends from the diaphragm to a point of use (not shown). The differential pressure sections 40 and 41 are connected with the output passages 20 and 21 by lines 44 and 45, respectively.

In operation, the system will be supplied with fluid under pressure from a suitable source through inlet 13. This fluid will create the power jet stream as it flows through nozzle 15. Control inputs will then be supplied from suitable sources through lines 26 and 27 to jets 22 and 23 to impinge on the power jet stream. If a pressure differential exists between the jets flowing from nozzles 22 and 23, the power jet stream will be deflected to supply one or the other of the output passages 20, 21 with fluid under pressure. It will be obvious that this pressure will be a function of the pressure supplied to the control passage 26 or 27. This fluid will flow to the vortex amplifier communicating with the output passage and the flow will be resisted by fluid introduced from source 37 through input nozzle 36 in the vortex amplifier. This resistance to flow will change the pressure of the fluid in the output passage in accordance with variations of the source 37. The resulting output pressure will thus be the product of both sources of control pressure. Since one of the output passages will receive more of the power jet stream than the other, the pressures in the output passages will be different but will bear a relation to the control inputs. These output pressures will cause the diaphragm of the actuator 38 to move and impart corresponding motion to the device connected to the rod 43.

I claim:

1. A fluidic multiplier, comprising:
   a. a variable flow resisting element having an inlet port, an outlet port, and a control port, the application of a fluid pressure to said control port governing the degree of communication between said inlet and outlet ports;
   b. a first means for supplying fluid at variable pressures to said inlet port;
   c. a second means for applying a control fluid at a predetermined pressure to said control port; and
   d. a third means communicating with said first means immediately upstream of the inlet port of said flow resisting element for withdrawing fluid under pressure equal to the product of the fluid pressures from said first and second means.

2. A fluidic multiplier according to claim 1 in which the second means is an element operative to apply a variable control fluid pressure signal to said control port.

3. A fluidic multiplier according to claim 1 in which the variable flow resisting element is a vortex flow control device having a circular chamber with a radially directed inlet, a centrally disposed outlet, and a control port discharging tangentially into said circular chamber.

4. A fluidic multiplier according to claim 3 in which the first means is a fluid amplifier having an output passage communicating with the inlet port of the variable flow resisting element.

5. A fluidic multiplier according to claim 4 in which the second means is a fluidic element operative to apply a variable control fluid pressure signal to said control port.

6. In a fluid multiplier circuit of the type having a pair of vortex amplifiers arranged in parallel with each vortex amplifier having an inlet port, a control port and an outlet port, and a pair of fluid output pressure taps, each tap communicating with one of said amplifier inlet ports, and means for varying the pressure differential between said output taps in response to fluid pressure input signals, said varying means comprising:

first means for supplying a fluid pressure differential to the respective inlet ports of said pair of vortex amplifiers, said first means producing a fluid pressure differential at the respective inlet ports that is proportional to and greater than the pressure differential between a first pair of input signals; and second means for supplying a fluid pressure differential to the control ports of said pair of vortex amplifiers, said second means providing said pressure differential to said control ports that is proportional to and greater than the fluid pressure differential between a second pair of input signals, said first and second fluid supplying means operating independently of each other, whereby the pressure differential supplied to said pair of output taps is a function of the product of the pressure differentials of said first and second input signals.

7. The apparatus according to claim 6 wherein said first supplying means includes a beam deflection fluid amplifier having a pair of outlet ports and a vent port, said outlet ports being independently connected with the inlet ports of said vortex amplifiers.

8. The apparatus according to claim 6 wherein said second supplying means includes a beam deflection fluid amplifier having a pair of outlet ports and a vent port, said outlet ports being independently connected with the control ports of said vortex amplifiers.